(12) United States Patent
Smith

(10) Patent No.: US 10,713,557 B2
(45) Date of Patent: Jul. 14, 2020

(54) CREATING PATTERN TEMPLATES FOR ENGINE MIX SETTINGS

(71) Applicant: International Business Machines Corporation, Armonk, NY (US)

(72) Inventor: Lawrence C. Smith, Charlevoix, MI (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 15/338,823

(22) Filed: Oct. 31, 2016

(65) Prior Publication Data

US 2018/0121818 A1 May 3, 2018

(51) Int. Cl.
*G06N 3/04* (2006.01)
(52) U.S. Cl.
CPC ...................... *G06N 3/04* (2013.01)
(58) Field of Classification Search
CPC .... F02D 29/02; F02D 41/2454; F02D 41/248; F02D 41/2445; F02D 41/26; F02D 2200/70; F02D 2200/50; F02D 41/0007; Y02T 10/40; G06N 5/047; G06N 99/005; G06N 3/006; G06N 3/04; Y04S 10/54
USPC ........ 701/102, 103, 110, 111, 112, 113, 115, 701/116
See application file for complete search history.

(56) References Cited

U.S. PATENT DOCUMENTS

| 5,297,046 A | 3/1994 | Nakaniwa |
| 8,185,491 B2 | 5/2012 | Kuester et al. |
| 8,332,335 B2 | 12/2012 | Kuester et al. |
| 8,352,150 B2* | 1/2013 | Hijikata ............... F02D 11/105 701/102 |
| 9,133,784 B2* | 9/2015 | Seaman .................. F02D 37/02 |

(Continued)

FOREIGN PATENT DOCUMENTS

WO 2013036763 3/2013

OTHER PUBLICATIONS

Morrow, Trey, "Formula 1 and HANA: How F1 Racing is Pioneering Big Data Analytics" [online], retrieved on Aug. 31, 2016 from the Internet URL: http://jeremystierwalt.com/2014/01/29/formula-1-and-hana-how-f1-racing-is-pioneering-big-data-analytics/. (Jan. 2014).

(Continued)

*Primary Examiner* — Sizo B Vilakazi
(74) *Attorney, Agent, or Firm* — Diana R. Gerhardt; Vincent L. Musgrove; Jack V. Musgrove

(57) ABSTRACT

Race car settings (e.g., Formula 1 engine mix settings) are developed for particular racing goals such as faster lap time, better acceleration, less vehicle wear, etc., using pattern templates that are derived from historical racing scenarios. The historical scenarios provide data on racing settings, racing results, and racing conditions such as squad information, equipment information, and environmental information. A cognitive (deep question answering) system can select an initial pattern template based on current racing conditions, and present suggested vehicle settings to the user (driver) using the initial pattern template. The driver can select from different candidate values for various factors, which may lead to the presentation of additional suggestions or the use of additional pattern templates. The final settings map is created based on the employed pattern templates and the driver selections.

20 Claims, 7 Drawing Sheets

(56) References Cited

U.S. PATENT DOCUMENTS

| | | | |
|---|---|---|---|
| 2007/0198184 A1* | 8/2007 | Yoshioka | G01C 21/32 |
| | | | 701/426 |
| 2007/0271026 A1* | 11/2007 | Hijikata | F02D 11/105 |
| | | | 701/103 |
| 2009/0271093 A1* | 10/2009 | Liu | F02D 41/1401 |
| | | | 701/104 |
| 2009/0292444 A1 | 11/2009 | Russell | |
| 2010/0204898 A1* | 8/2010 | Wyatt | F02D 35/027 |
| | | | 701/102 |
| 2011/0153175 A1* | 6/2011 | Zhang | B60W 40/09 |
| | | | 701/70 |
| 2014/0052364 A1* | 2/2014 | Kim | F02N 11/0803 |
| | | | 701/113 |
| 2014/0067800 A1 | 3/2014 | Sharma | |
| 2014/0180513 A1* | 6/2014 | Kozloski | B60W 10/02 |
| | | | 701/22 |
| 2018/0121818 A1* | 5/2018 | Smith | G06N 3/04 |

OTHER PUBLICATIONS

Hawksworth, Robin, "Lesson on big data from Formula 1" [online], retrieved on Aug. 31, 2016 from the Internet URL: http://www.rdhawksworth.com/lesson-on-big-data-from-formula-1.html. (Nov. 2013).

Gohring, Nancy, "How the Lotus F1 team builds a private cloud for each race" [online], retrieved on Aug. 31, 2016 from the Internet URL: http://www.citeworld.com/article/2366960/big-data-analytics/lotus-f1-team-private-cloud-microsoft-avanade.html. (Jun. 2014).

Lunarpages, "Off to the Races: Big Data and the Need for Speed" [online], retrieved on Oct. 11, 2016 from the Internet URL: http://www.lunarpages.com/uptime/races-big-data-and-need-speed. (Apr. 2014).

Allen, James, "Formula 1 engine mapping—Your questions answered" [online], retrieved on Aug. 30, 2016 from the Internet URL: https://www.jamesallenonf1.com/2011/06/formula-1-engine-mapping-your-questions-answered/. (Jun. 2011).

F1 Scarlet, "Technical and Business Aspects of Formula1" [online], retrieved on Aug. 31, 2016 from the Internet URL: http://www.f1scarlet.com/tech&busin_aspectsf1.html#Electronic (Mar. 2008).

Formula 1 Dictionary, "ECU—Electronic Control Unit MES—McLaren Electronic Systems" [online], retrieved on Aug. 31, 2016 from the Internet URL: http://www.formula1-dictionary.net/ecu.html (Feb. 2008).

McLaren Applied Technologies, "ATLAS Advanced Telemetry Linked Acquistion System" [online], retrieved on Aug. 31, 2016 from the Internet URL: http://www.mclarenelectronics.com/Products/Product/ATLAS (Feb. 2002).

Formula 1 Dictionary, "Engine Torque Map and Pedal Map" [online], retrieved on Aug. 31, 2016 from the Internet URL: http://www.formula1-dictionary.net/engine_torque_map.html (Nov. 2012).

McLaren Applied Technologies, "Standard ECU for Formula 1" [online], retrieved on Aug. 31, 2016 from the Internet URL: http://www.mclarenelectronics.com/Systems/CaseStudy/Formula%20One (Jun. 2014).

* cited by examiner

CREATING PATTERN TEMPLATES FOR ENGINE MIX SETTINGS

CROSS-REFERENCE TO RELATED APPLICATION

This application is related to U.S. patent application Ser. No. 15/338,862 entitled "USING COGNITIVE ANALYSIS WITH PATTERN TEMPLATES TO COMPOSE ENGINE MAPPING MIX SETTINGS" filed concurrently herewith, which is hereby incorporated.

BACKGROUND OF THE INVENTION

Field of the Invention

The present invention generally relates to setting operational parameters for a vehicle, and more particularly to a method of calculating automotive settings in a high performance race car.

Description of the Related Art

Modern Formula 1 and other high performance race cars use complex engine management strategies to optimize performance and reliability of the cars on race tracks. High performance race cars use engine management software that modifies the mix and other automotive settings of electronic control unit that control the power unit and other components of the vehicle. The mix settings engine mode and other automotive settings can be adjusted by the driver from the cockpit using dials and switches on the steering wheel. These settings are adjusted based on race conditions, weather, and many other factors. A limited number of settings are available to the driver and race rules require that these must be programmed into the engine management systems before qualifying. The availability and selection of settings for specific situations, conditions or corners can significantly affect on-track performance and race results.

Engine mix settings are detail changes to fueling that are routinely used during the race to optimize between fuel consumption and engine power. This is also known as the "air-fuel ratio" (AFR), which is the mass ratio of air to fuel present in a combustion process such as in an internal combustion engine. The AFR is an important measure for performance-tuning reasons. If exactly enough air is provided to completely burn all of the fuel, the ratio is known as the stoichiometric mixture. AFR numbers lower than stoichiometric are considered "rich". Rich mixtures are less efficient, but may produce more power and burn cooler, which is kinder on the engine. AFR numbers higher than stoichiometric are considered "lean." Lean mixtures are more efficient but may cause engine damage or premature wear and produce higher levels of nitrogen oxides. Other settings which are used to optimize performance include the car's camber angle, shock absorber stiffness, and front/rear height among others.

In Formula 1, the driver can choose which settings to use during any particular stint, segment or corner, but the mix settings map and other engine maps (e.g., engine torque map) must be designed before the race qualifying and the maps cannot be changed during the race. For example, as the car goes down a straight section of the race track into a hair-pin corner, the driver may change the mix settings to help accelerate out of the hair-pin, while a different setting may be used when entering a set of S-curves. Similarly, mix settings may be changed to optimize engine reliability, fuel consumption, tire wear, and even driver fatigue. Another example would be that when tire wear is detected the driver may be instructed by a human advisor to change a certain setting to a specific value, which then programs the engine performance to be less demanding on the tires. Automotive settings are also adjusted to improve reliability of parts that may need to be used in future races.

The mix settings are configured in a mix settings map (also known as an ignition map). The mix settings map is constructed by the team before the race begins based on prior experience, and its usage during the race can greatly influence the lap times, passing opportunities, full-race times of the cars, race results and the success of the team. Creating the mix settings map is an application of Big Data analytics. Up to 2 gigabytes of data can be collected for each car per race just in telemetry, a single race weekend can generate over 100 gigabytes of data, and a season generates terabytes of data per car. The software and procedures the teams use to create mix settings maps is proprietary. Teams likely use spreadsheets, analysis software, database reports, and performance graphs to analyze the data, determine the strategy for the mix settings map, and then produce a map which is then refined through practice and testing.

SUMMARY OF THE INVENTION

The present invention in at least one embodiment is generally directed to developing a racing strategy for vehicle settings by receiving a plurality of racing scenarios from a racing data repository wherein each racing scenario includes racing conditions, racing vehicle settings, and racing results, analyzing the racing scenarios to associate specific racing vehicle settings with certain racing conditions and optimal racing results, and creating a pattern template for one or more racing goals based on the specific racing vehicle settings and certain racing conditions. The racing goals can be for example faster lap time, better acceleration, less vehicle wear, better fuel economy, more stability, and improved cornering. Racing conditions can include items such as squad information, equipment information, and environmental information. In some embodiments, the pattern template includes a set of filters, a set of suggestions for the racing vehicle settings, or a factor having multiple candidate settings. The settings can for example include an engine mix setting specifying an air-to-fuel ratio.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

Figure 1:
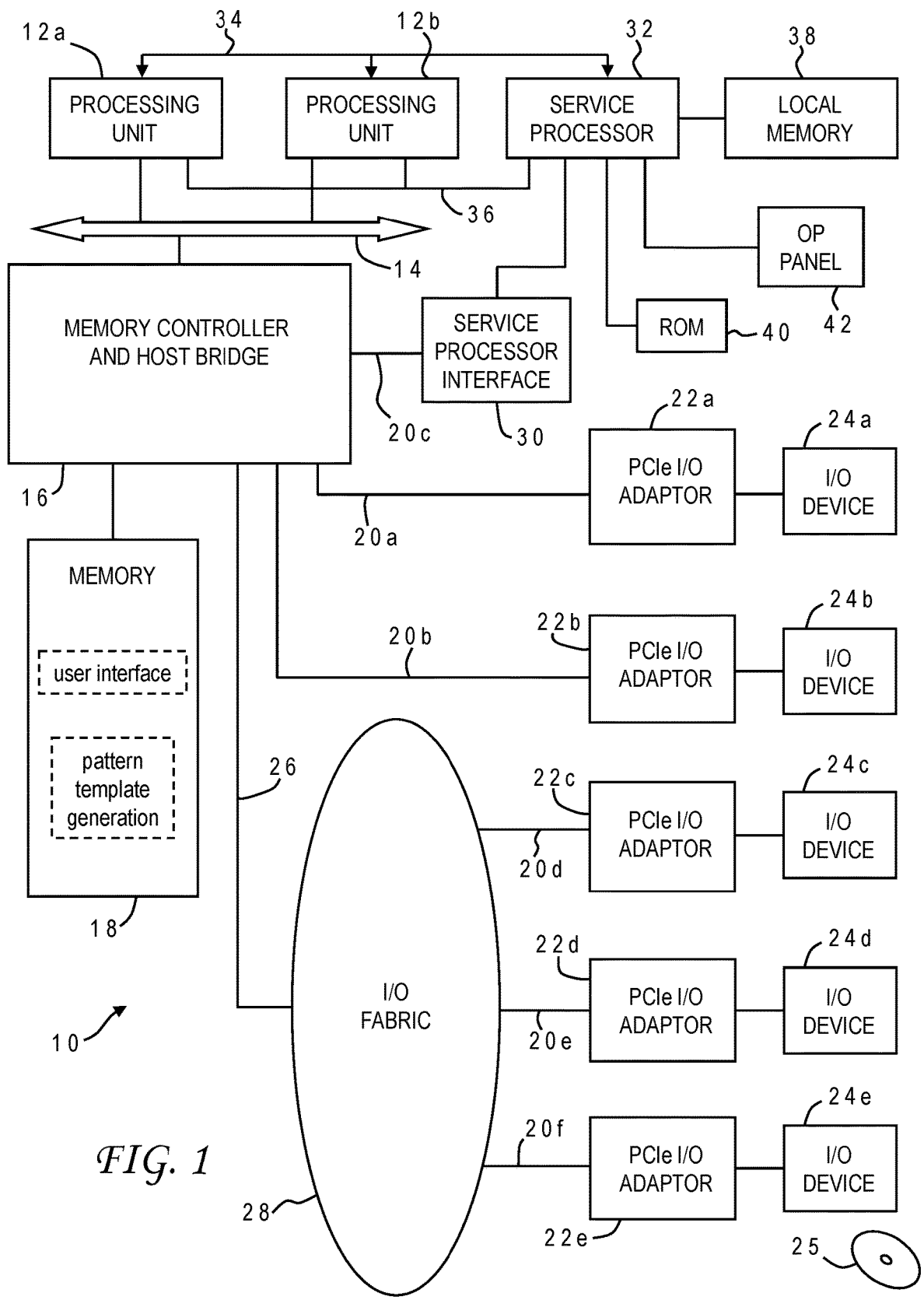
FIG. 1 is a block diagram of a computer system programmed to carry out cognitive analysis and/or pattern template generation in accordance with one implementation of the present invention.

DESCRIPTION OF THE PREFERRED
EMBODIMENT(S)

The term "artificial intelligence" is applied when a machine mimics cognitive functions that humans associate with other human minds, such as learning and problem solving. A modern implementation of artificial intelligence is the IBM Watson™ cognitive technology, which is an artificially intelligent computer system capable of answering questions posed in natural language. IBM Watson is a deep question answering (QA) system which applies advanced natural language processing, information retrieval, knowledge representation, automated reasoning, and machine learning technologies to the field of open domain question answering. More than 100 different techniques are used to analyze natural language, identify sources, find and generate hypotheses, find and score evidence, and merge and rank hypotheses. The more algorithms that find the same answer independently, the more likely that answer is correct.

As interactions between users and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand.

Deep question answering systems can identify passages from documents (corpora) and analyze them in various ways in order to extract answers relevant to a query; answers can be scored on a number of factors, and the highest score indicates the "best" answer. Models for scoring and ranking the answer are trained on the basis of large sets of question and answer pairs.

One implementation of IBM Watson is the IBM Watson Retrieve and Rank™ service, which combines several machine learning techniques (known as learning-to-rank algorithms) to help users find documents that are more relevant than those that might be found with standard information retrieval techniques. Learning-to-rank or machine-learned ranking is the application of machine learning, typically supervised, semi-supervised or reinforcement learning, in the construction of ranking models for information retrieval systems. Training data consists of lists of items with some partial order specified between items in each list. This order is typically induced by giving a numerical or ordinal score or a binary judgment (e.g. "relevant" or "not relevant") for each item. The ranking model's purpose is to rank, i.e. produce a permutation of items in new, unseen lists in a way which is "similar" to rankings in the training data in some sense.

As described above, methods that Formula 1 teams typically use choose a specific mix settings map or other vehicle configuration includes the use of spreadsheets, analysis software, database reports, and performance graphs. Such methods tend to be laborious, time-consuming, and require a high level of user interaction and direction to produce the final, fully-optimized map. The more manual methods can be much less efficient, and other methods still fail to identify hidden patterns in large quantities of data, which, if revealed, could significantly impact racing performance (lap times, speed, engine wear, etc.) on the track.

It would, therefore, be desirable to devise a system which could perform cognitive analysis on the relevant data sets to identify mix and other automotive settings that can improve lap times and race results. For example, cognitive analysis may identify that although one setting may improve speed in turn #3 by 0.100 seconds, the data might reveal through analytics that using a different setting through turn #3 may reduce tire or brake temperatures, which would improve performance through turn #4 by 0.200 seconds (giving a net improvement in lap time of 0.100 seconds). The present invention can use a system and process to analyze performance and other data for selected conditions to create an optimal vehicle setting for that condition. By performing a guided interaction with the user (e.g., the driver) to access a big data repository and a cognitive system to suggest possible conditions and automotive settings, the car's settings can be fully optimized for a particular condition. For racing engine mix settings, the process guides the user using the pattern template, cognitive analysis, and interactions so that the goals, equipment, squad and conditions are combined into collection sets (items collected into the analysis, as a factor to be used to produce the result).

Vehicle settings can be further optimized by comparing and combining settings from multiple conditions. Suggestion sets (items that are presented as available for selection by the user) and collection sets can be compared and blended to modify and tune their behavior. By comparing and blending the automotive settings, the driver can create a composed condition which can be published to an engine mode setting. This process of progressive filtering using a guided interrogation of the cognitive system enables the engine mix and other automotive settings to be composed using a wide variety of available factors and conditions, then published as reusable constructs.

With reference now to the figures, and in particular with reference to FIG. 1, there is depicted one embodiment 10 of a computer system in which the present invention may be implemented to carry out the various processes associated with pattern template generation and determination of automotive settings in accordance with the present invention. Computer system 10 is a symmetric multiprocessor (SMP) system having a plurality of processors 12*a*, 12*b* connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention which may perform various functions such as displaying a user interface and/or pattern template generation.

MC/HB 16 also has an interface to peripheral component interconnect (PCI) Express links 20*a*, 20*b*, 20*c*. Each PCI Express (PCIe) link 20*a*, 20*b* is connected to a respective PCIe adaptor 22*a*, 22*b*, and each PCIe adaptor 22*a*, 22*b* is connected to a respective input/output (I/O) device 24*a*, 24*b*. MC/HB 16 may additionally have an interface to an I/O bus 26 which is connected to a switch (I/O fabric) 28. Switch 28 provides a fan-out for the I/O bus to a plurality of PCI links 20*d*, 20*e*, 20*f*. These PCI links are connected to more PCIe adaptors 22*c*, 22*d*, 22*e* which in turn support more I/O devices 24*c*, 24*d*, 24*e*. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12*a*, 12*b* may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20*c* connects MC/HB 16 to a service processor interface 30 to allow communications between I/O device 24*a* and a service processor 32. Service processor 32 is connected to processors 12*a*, 12*b* via a JTAG interface 34, and uses an attention line 36 which interrupts the operation of processors 12*a*, 12*b*. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12*a*, 12*b* and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12*a*, 12*b* for execution of the program code, e.g., an operating system (OS) which is used to launch applications and in particular the vehicle settings map application of the present invention, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a process that uses novel analysis techniques to derive a pattern template for use in a high-performance vehicle (such as a Formula 1 racing car). Accordingly, a program embodying the invention may include conventional aspects of various engine configuration tools, and these details will become apparent to those skilled in the art upon reference to this disclosure.

Figure 2:
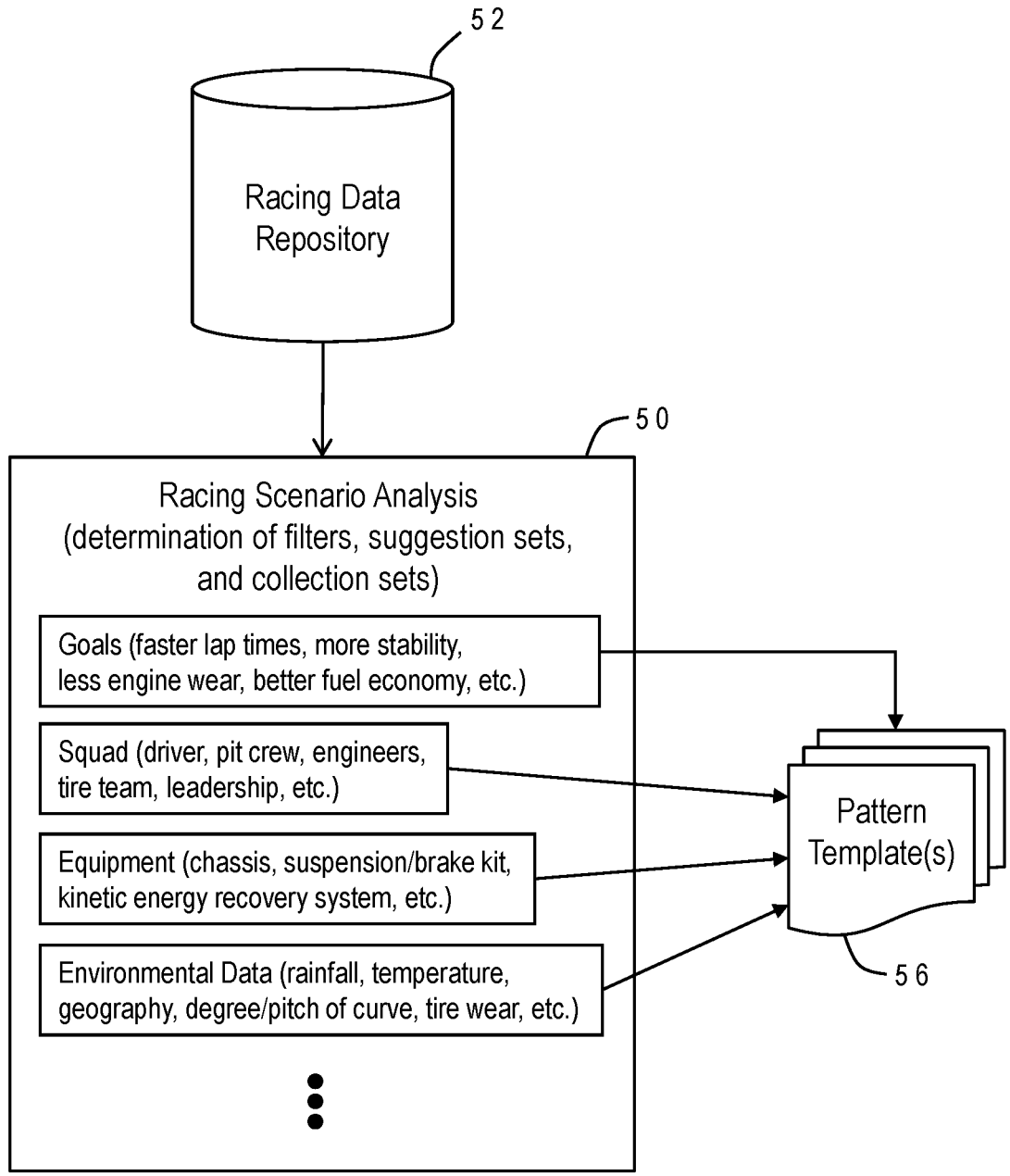
FIG. 2 is a block diagram of cognitive analysis logic that may be carried out by the computer system of FIG. 2 to generate pattern templates for engine mapping mix settings in accordance with one implementation of the present invention.

Referring now to FIG. 2, there is depicted one implementation for the racing scenario analysis 50 which computer system 10 may carry out in order to extract racing scenario data from an actual stint, lap, race, or collection of stints, laps, or races. Racing scenario analysis 50 can receive racing information from a racing data repository 52. Racing data repository 52 contains data (both historic and real-time) pertaining to various racing scenarios, including racing conditions, racing vehicle settings, and racing results (final or intermediate).

Figure 3:
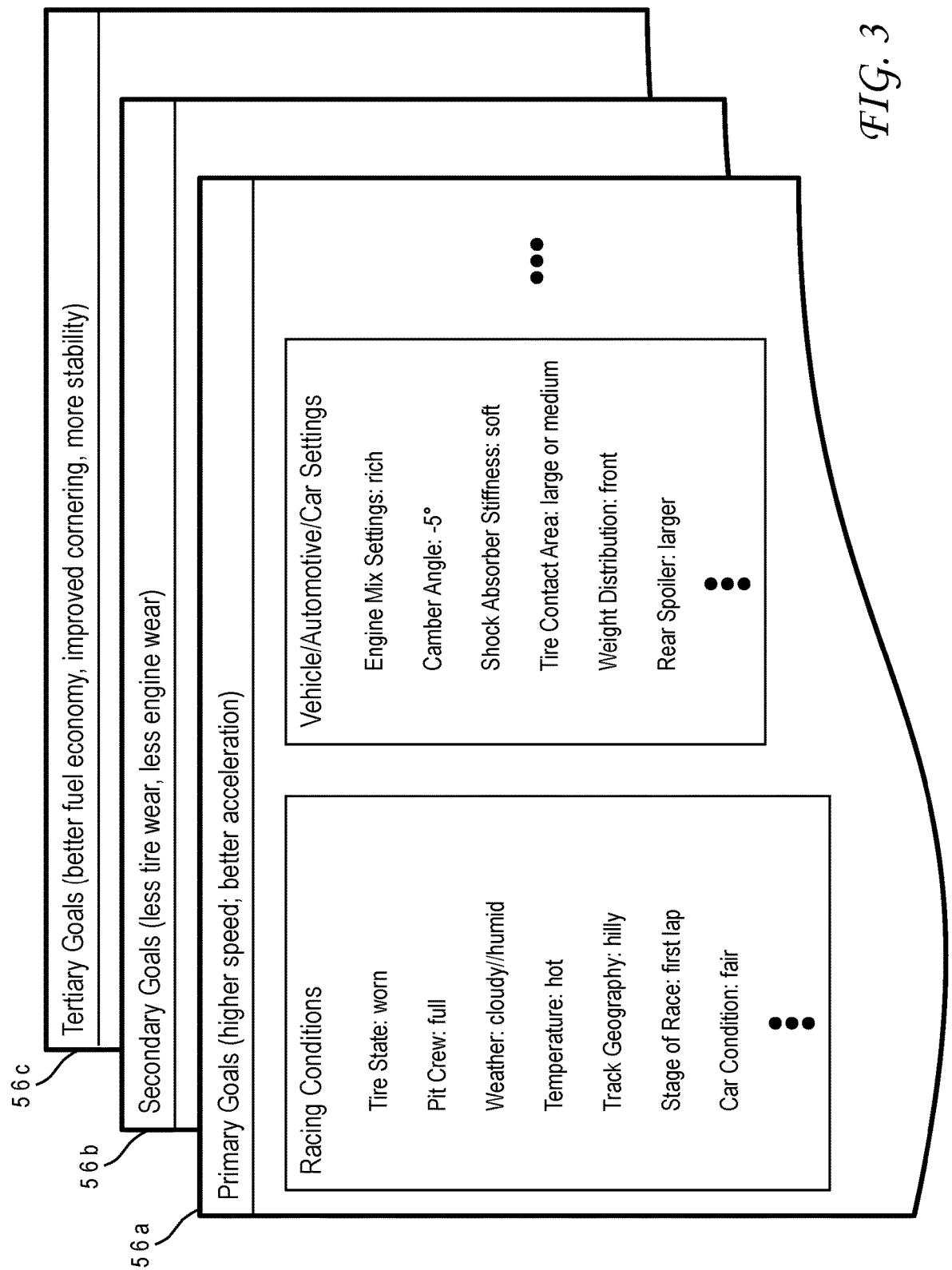
FIG. 3 is a block diagram of a series of exemplary pattern templates constructed in accordance with one implementation of the present invention.

Racing scenario analysis 50 can extract data from races relating to a variety of different racing conditions. In the illustrative embodiment, racing scenario analysis 50 extracts racing data relating to the environment, squad, equipment, and goals. While FIG. 3 shows only these categories for racing data, those skilled in the art will appreciate that other categories may be extracted as well.

Goals for mix and other automotive settings can include many possible factors. One type of goal might have to do with higher speeds, better acceleration or faster lap times. Other goals could also include, among other things, more stability, less engine wear, better fuel economy, reduced brake wear, reduced tire wear, and improved cornering. Goals will typically have performance metrics or variables associated with them which indicate whether and to what extent a given goal has been or is being met. Goals are indicated by the racing results in racing data repository 52

Environmental data includes data about specific track conditions. This includes information about the climate during a specific racing scenario (such as rainfall amount, track temperature, and air temperature and density) in addition to information pertaining to the characteristics of the track itself (such as track geography, the degree and pitch of a specific curve, and the clag factor). Data pertaining to the condition of the car can be considered environmental data as well. A racing scenario could include data pertaining to the stage of race, car condition, tire wear, or any other condition relevant to the state of the car.

Squad information can have several facets. In high-performance racing, squads are usually composed of the driver, pit crew, engineers, support crew, pit wall, factory and tire teams, and leadership. Other people or entities not listed may also be included in racing scenario squad data.

Equipment includes specific hardware and software configurations for the vehicle. A typical racing car might have a chassis, power units, kinetic energy recovery system, electronics, steering wheel, and suspension/wing/brake/aero kits.

While these examples of racing data are fairly comprehensive, this list is not intended to be exhaustive. Racing analysis 50 can be used to collect racing data from many separate races (e.g., hundreds or thousands), and then correlate this data with the vehicle's race settings (engine mix setting and other configurations) to identify which settings are optimal for a given context. This racing data is then consolidated into one or more pattern templates 56 for later use by the cognitive system.

FIG. 3 shows exemplary pattern templates 56 that might be constructed via racing analysis 50 in accordance with some implementations of the present invention. Each template is created using a specific set of goals for a specific set of racing conditions. Pattern templates are used to guide and manage the fuel mixture and other configuration settings in a high performance/efficiency vehicle. Using a template-driven conversational user interface, the user can fill out a subset the data as organized on the template, resulting in a mix setting or other vehicle configuration being derived from these criteria.

Three different templates 56a, 56b, 56c are provided for three different goal sets. Any of these three templates could be used during a single race depending upon the underlying racing conditions. Template 56a is for a tertiary set of goals; template 56b is for a secondary set of goals; template 56c is for a primary set of goals. In these examples, the goals for template 56a are purely about speed and acceleration, the goals for template 56b purely pertain to vehicle equipment wear, and the goals for template 56c are based on other performance variables (e.g., better fuel efficiency).

FIG. 3 provides sample details for the racing conditions in the primary goal template 56a. Data pertaining environmental variables are included in this specific pattern template, such as the weather conditions (cloudy/humid), track temperature (hot), and track geography (hilly). Other information included in the template is data pertaining to both the state of the equipment on the vehicle (worn tires; fair car condition) and the racing squad (full pit crew). This list is not intended to be exhaustive but merely illustrative of the possible types of racing conditions that can be contained within the pattern template.

Primary goal template 56a also contains data about the various customizable car/automotive/vehicle settings which influence the performance of the vehicle. One such setting is the engine mix settings, which (as discussed above) dictates the richness or leanness of the air-fuel mixture. Other automotive settings include the camber angle (−5°), shock absorber stiffness (soft), and tire contact area (large). This list is not intended to be exhaustive but merely illustrative of the possible types of customizable automotive configurations contained within the pattern template. Templates may have a default setting for certain automotive configurations. A given setting may have multiple candidate values.

The system is not limited to use of a single pattern template, but rather is able to use more than one pattern template. This is accomplished by pre-defining and storing more than one template or a series of templates, and then combining these templates to form a larger template. The template instance is, in effect, in a multi-dimensional matrix of templates. For the example, there may only be a few parts of the racing squad/team, so a smaller template would only include data available in the garage.

The user can select a given template when creating a mix setting which comes from a palette of templates, preferably suggested by a cognitive system. These templates can be compared to one another and blended together to create a composed template which can be published to an engine mode setting. For example, one template instance may produce a mix setting result, and another may produce a suspension camber offset, and these would collaborate to optimize to achieve the goal, such as faster speed through a particular corner. Combining pattern templates (both complete and incomplete) as a subset that can be substituted into the larger template and possibly override patterns of other templates.

Figure 4:
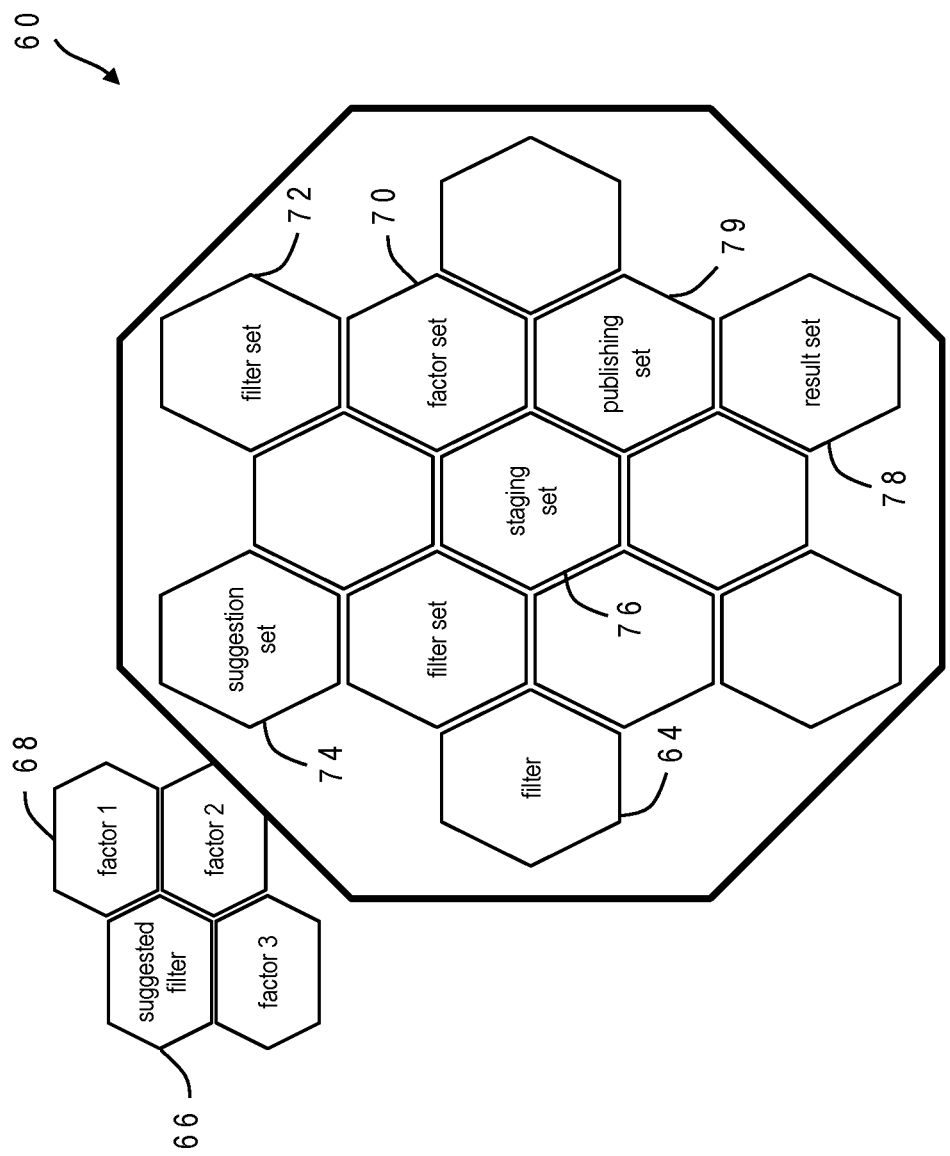
FIG. 4 is a pictorial representation of a conversational user interface in accordance with one implementation of the present invention.

FIG. 4 shows generally how a template-driven user interface 60 works in the illustrative implementation. This automated system enables the composition of mix and other automotive settings to be a derived from a pre-defined set of steps, roles, filters, and factors. Using user interface 60, a mix or other automotive setting is composed by leading a dialog with the cognitive system by composing factors into filter sets, suggestion sets, and collection sets using a pattern template. For composing mix settings to optimize the performance of automotive power units, the system provides a pattern of filters and conditions relevant to the car, driver, team and track. User interface 60 may be presented as a touch screen within the race car, controlled by the driver.

The presentation of the pattern template 56 guides the cognitive analysis to provide suggestion and collection sets, which steps to follow, as well as other factors related to the current step, selected factors, filters, templates, history, and other aspects of the state of the analysis. The automated system guides selections by presenting a palette of factors and filters from which to select, edit, blend, compare and compose. In the example user interface 60, the question and answers are represented as a honeycomb of cells, navigational aids, and information areas and glyphs. The system allows the order of selecting and navigating among the conditions and factors to be arbitrary.

The system enables the selection of a filter 64 followed by presentation of a palette of suggested filters 66 and factors 68, where factors can be added to a suggestion set 74 and transitioned to other suggestion or collection sets 70 and 72 and to a staging set 76, which may be added to a result set 78 and publishing set 79. Selected items can publish content and editors a multi-function display 92 (shown in FIG. 5).

The automated system provides a user interface to select filters 64 and factors 68, and add them in collection sets representing results. Filter 64 can consist of a set of keywords, queries, commands, or questions such that the system displays a filtered list of possible values. When an item is selected, a filter is constructed. As an illustrative example, when "Tire Choice" is selected, "Hard," "Medium," "Soft," "Super-Soft," and "Ultra-Soft" would be presented as refinements of the selection. "Tire Choice" is the filter, and filters are designed using the same paradigm. The automated system provides suggestions such as which filters to select (i.e. suggested filter 66) and which factors 68 to select from using a pattern stored in the pattern template 56. Factor set 70 represents a collection of factors, while filter set 72 represents a collection of filters.

Selecting a filter 64 displays a set of other suggested filters 66, plus factors 68 that can be applied to the question package. Factor 68 describes a particular contributor to a condition. A given factor 68 can have many attributes, such as values and ranges, which can be edited as properties to tune its relevance. Suggested filter 66 and factor 68 show a set of selections around a filter.

Suggestion set 74 is a set of selected items held in a staging area. When a user selects an item on the screen, the properties of the item are displayed in the inspector. In addition a set of related objects are cognitively suggested and presented to the user. When a user finds something that they want to include in the analytics, they add it to a collection set in the stage. When a topic is selected, possible values are presented. These are then added to the center staging area.

In this illustrative embodiment, when a cell is selected, the properties are presented, and related items are presented on the screen. There is a stage in the middle (staging set 76) where the selections are composed, and a palette of selections presented which can be explored or selected. The production ring is the stage in the center (staging set 76) and is where the selections are collected. When any item is selected, the selection area changes to show the new selections, and also enables the user to drill down. The general pattern of initial filters is in the outermost hex of the stage, and these can be refined through further filters and selections. Going through this cycle is one pattern type of the template, but this is not to be construed in a limiting sense, as there can be others.

Result set 78 is a set of selected items collected for publishing or use as a composed unit. Result set 78 contains all of the mix and other automotive settings to be published. These may not necessarily be shown, may not be mutable, and might only be automatically published. Result set 78 is in a format where the mix settings are actually determined. Publishing set 79 is a collection of items (i.e. results) that have been published.

Figure 5:
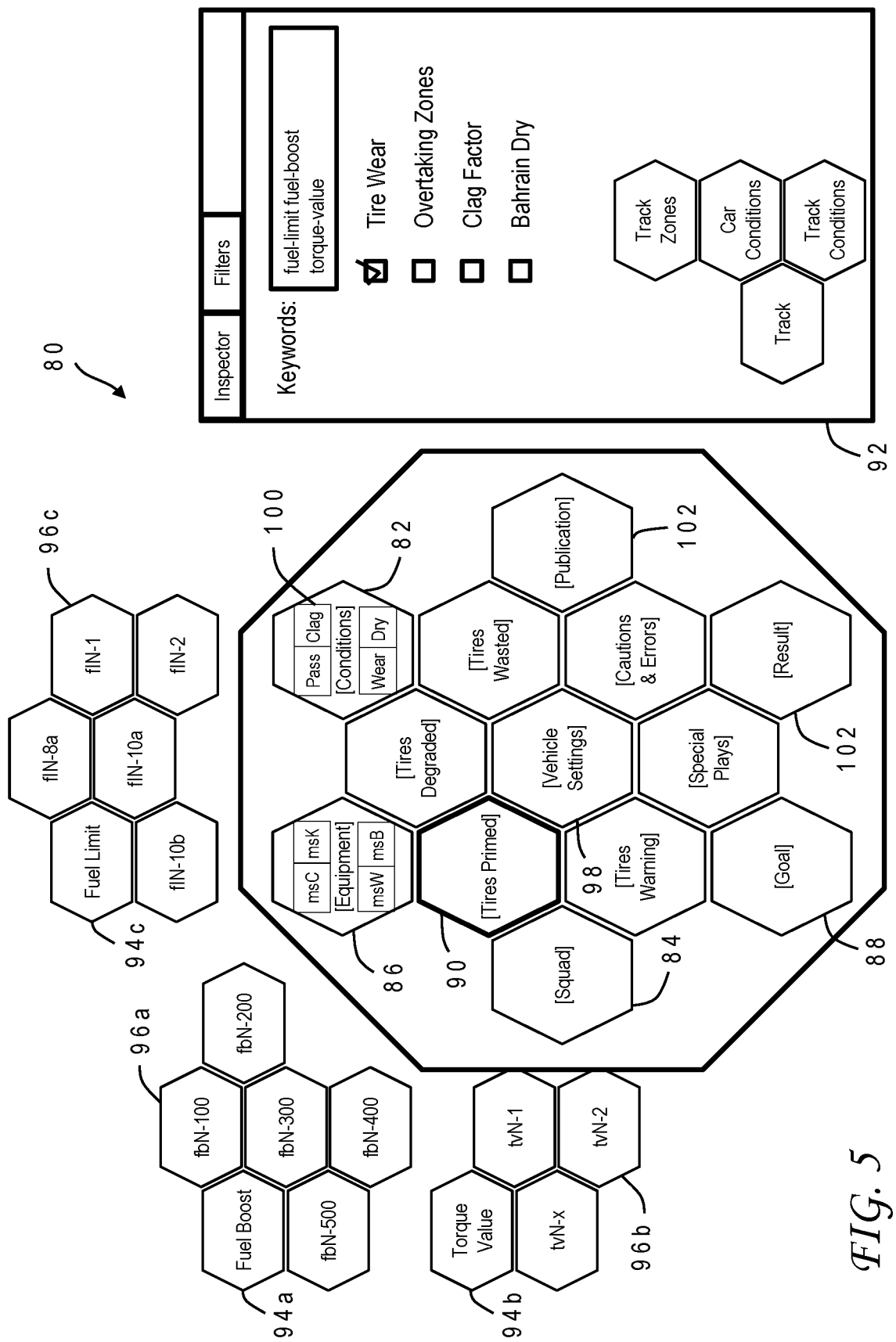
FIG. 5 is a pictorial representation of a specific pattern template as displayed on a user interface and modified by a user in accordance with one implementation of the present invention.

The pattern template 56 is a collection of possible values to seed the analysis and composition on a template-driven user interface 60. FIG. 5 is an illustration of a specific pattern template 80 loaded onto the template-driven conversational user interface. It provides for a way to store and recall a specific question and answer domain, and applies the process to a particular domain. The specific pattern template 80 guides the user through a set of complex choices using cognitive search and pattern matching to provide relevant topics for which data can be obtained and question and answer can commence. If a process is followed that fills out a subset the data as organized on this specific pattern template 80, then a mix or other automotive configuration can be derived from these criteria. In addition, once a path has been followed, it can be saved for the future, where different answers or paths can be explored. A more complex template captures a set of sessions as a multi-dimensional structure of options followed or available.

For composing for racing engine mix settings the pattern template is comprised of filters, factors and conditions including but not limited to a subset of environmental conditions 82, squad variables 84, equipment variables 86, and goals 88. The illustrative embodiment in FIG. 5 shows that the equipment variable "Tires Primed" has been selected. This pulls up the window on the right (multifunction display 92), as well as pulling up the flattened hexes representing factor suggestions 94a-c and corresponding factor choices 96a-c. Selecting "Tires Primes" displays other factors 94a-c which are somehow related or associated (ex. "fuel boost", "torque value", "fuel limit"), and suggested values for those factors. A user can select a hex around the octagon, which is then added to the automotive settings 98. Selecting "Tires Primed" can also bring up the drill down hexes 100 inside "Equipment" and "Conditions."

Once a sufficient number of automotive settings has been added, a user can select results 102, which will show the user the results (i.e. all of the selected conditions, factors, and settings) of the particular selections which have been made.

A user also has the choice to select publication 102, which will publish the results to another computer system, terminal, or user interface.

Figure 6:
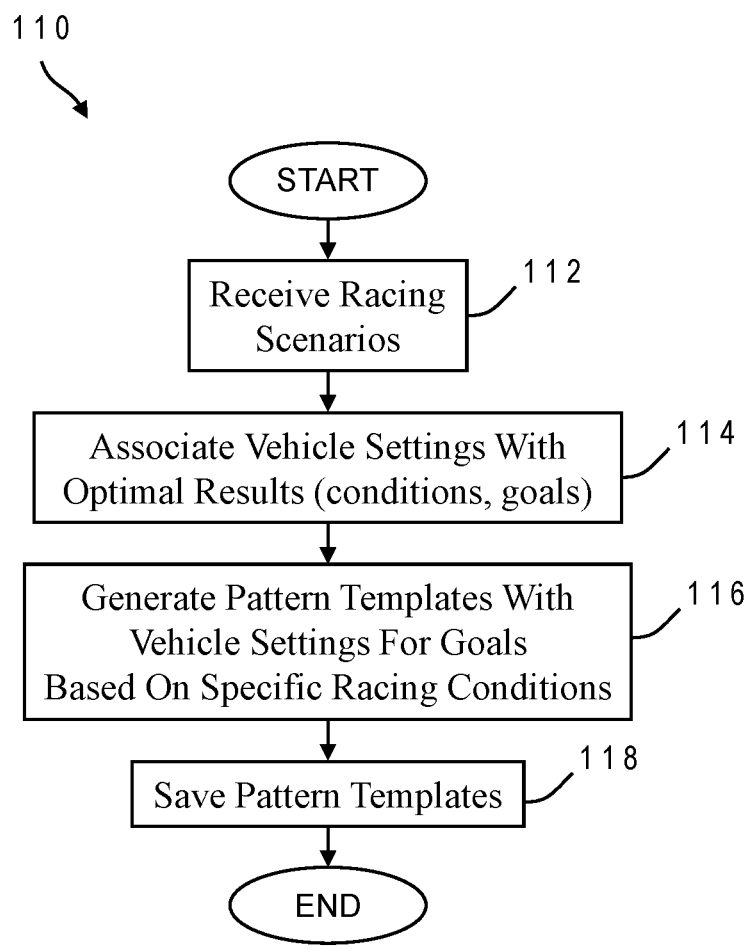
FIG. 6 is a chart illustrating the logical flow for pattern template generation in accordance with one implementation of the present invention.

The present invention may be further understood with reference to the chart of FIG. 6 which illustrates the logical flow for a pattern template generation process 110. Process 110 begins when a computing device such as computer system 10 receives racing scenarios 112. The scenarios are associated with optimal results 114. This association may be based on a variety of criteria, such as performance scores or particular goals involved (such as better acceleration or less engine wear). The criteria may be adjusted to ensure an adequate sampling of the scenarios. Use of multiple scenarios allows the cognitive system to statistically correlate particular racing data with optimal racing settings and configurations 114. In other words, if one particular automotive setting or configuration is present for a particular context in an overwhelming number of optimal results, that configuration is designated as a primary suggestion in the template by the cognitive system. The exact statistical parameters defining a positive correlation are up to the designer of the scenario analysis logic.

The computer system can take the optimal scenarios and their corresponding automotive settings and use them to generate the templates 116, which are then saved for later deployment 118. Pattern templates may be updated or replaced over time by including more recent racing scenarios and/or excluding older racing scenarios from the analysis. This continuous updating of the templates helps keep the cognitive Q&A relevant to current racing conditions.

In one possible implementation a cognitive system can take as input a selection made by the user, which would then compose a Watson Retrieve and Rank query to provide the other related suggestions at various confidence levels (e.g., 50%, 90%). That is, making a selection will show more suggestions to refine or change the parameters. Adding a suggestion to the stage would include the selection's parameter values in the analytics.

Figure 7:
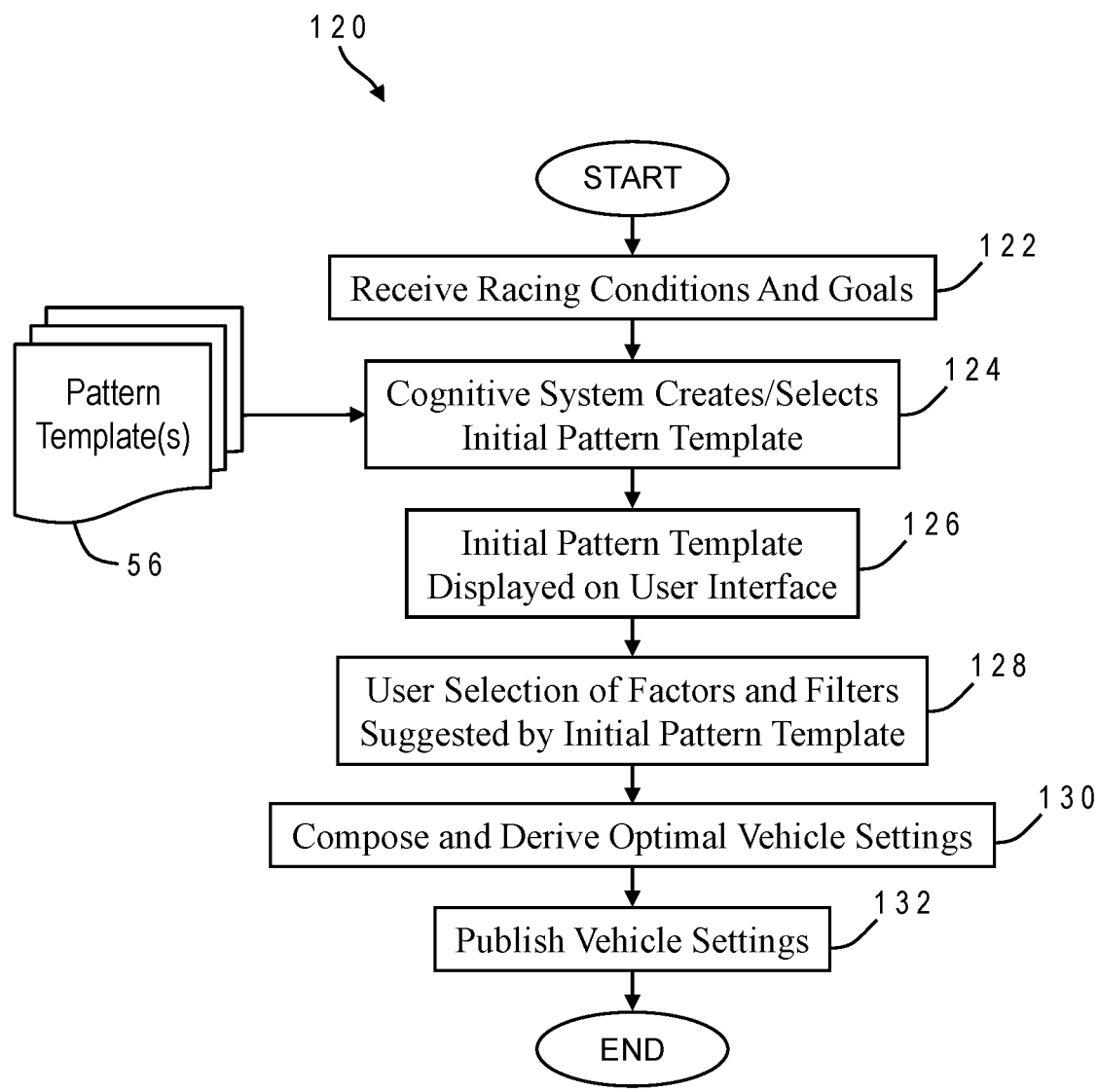
FIG. 7 is a chart illustrating the logical flow for deriving and publishing vehicle settings via one or more specific pattern templates in accordance with one implementation of the present invention.

FIG. 7 illustrates how the templates may subsequently be used in accordance with the present invention. This settings composition process 120 begins with the computer system (e.g., cognitive analysis) receiving various racing conditions 122 for the current race containing data about the environment, squad, equipment, and goals. The cognitive system then uses the racing scenario data to create a unique pattern template which is specially customized to the same or similar set of racing data 124. That template is then applied to exercise control over the display and navigation of the user interface 126. Upon the user filling in (either partially or completely) the choices provided in the pattern template as displayed on the user interface 128, a mix or other automotive setting can be arrived at 130. In effect, the value ranges, data repositories, visualizations, result descriptors, and other factors selected while navigating the selection space guided by the template becomes a useful analytic resource for the user, such that the mix or other automotive settings needed to program the car are determined 130 after sufficient user input. After these settings have been presented to the user, the user then has the choice to publish these automotive settings 132 to another system. The user interface provides for publishing, storing and sharing results. Publishing 132 can be to a remote system, a connected or intelligent device such as a steering wheel, to a screen, or elsewhere. For Formula 1 mix settings, the results could be published to the steering wheel, engine control unit, as well as engineering and race workstations.

The present invention accordingly possesses many advantages over conventional automotive configuration strategies. It is easily adapted to any set of racing conditions and any UI format. Leveraging the tactics and strategies used by cognitive computing results in a superior automotive configuration setup as compared to setups which more rudimentary or manual methods would most likely produce. By deconstructing and analyzing statistics of the strategies used in a set of racing scenarios, and combining them with optimal automotive settings, the user is able to deploy optimal automotive settings in a time-relevant manner. The invention not only makes the optimal choices for automotive settings, but additionally makes it easier for a user to customize and find the optimal settings, thus providing a more useful analytic resource when compared to spreadsheets or traditional data visualizations.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the context of Formula 1 racing, it is of course applicable to other types of car racing, as well as other vehicles such as motorcycles. The invention further has applicability in non-race settings, such as optimizing fuel consumption, equipment wear, or speed in fleet vehicles. It is therefore contemplated that such modifications can be made without departing from the spirit or scope of the present invention as defined in the appended claims.

What is claimed is:

1. A method of developing a racing strategy for vehicle settings comprising:
   receiving a plurality of racing scenarios from a racing data repository wherein each racing scenario includes racing conditions, racing vehicle settings, and racing results, by executing first instructions in a computer system;
   analyzing the racing scenarios to associate specific racing vehicle settings with certain racing conditions and optimal racing results, by executing second instructions in the computer system; and
   creating a pattern template for one or more racing goals based on the specific racing vehicle settings and certain racing conditions, by executing third instructions in the computer system.

2. The method of claim 1 wherein the racing goals are selected from the group consisting of faster lap time, better acceleration, less vehicle wear, better fuel economy, more stability, and improved cornering.

3. The method of claim 1 wherein the racing conditions include at least squad information, equipment information, and environmental information.

4. The method of claim 1 wherein the pattern template includes a set of filters.

5. The method of claim 1 wherein the pattern template includes a set of suggestions of the racing vehicle settings.

6. The method of claim 1 wherein the pattern template includes at least one factor having multiple candidate settings.

7. The method of claim 1 wherein the settings include an engine mix setting specifying an air-to-fuel ratio.

8. A computer system comprising:
   one or more processors which process program instructions;
   a memory device connected to said one or more processors; and
   program instructions residing in said memory device for developing a racing strategy for vehicle settings by receiving a plurality of racing scenarios from a racing data repository wherein each racing scenario includes racing conditions, racing vehicle settings, and racing results, analyzing the racing scenarios to associate specific racing vehicle settings with certain racing conditions and optimal racing results, and creating a pattern template for one or more racing goals based on the specific racing vehicle settings and certain racing conditions.

9. The computer system of claim 8 wherein the racing goals are selected from the group consisting of faster lap time, better acceleration, less vehicle wear, better fuel economy, more stability, and improved cornering.

10. The computer system of claim 8 wherein the racing conditions at least includes squad information, equipment information, and environmental information.

11. The computer system of claim 8 wherein the pattern template includes a set of filters.

12. The computer system of claim 8 wherein the pattern template includes a set of suggestions of the racing vehicle settings.

13. The computer system of claim 8 wherein the pattern template includes at least one factor having multiple candidate settings.

14. The computer system of claim 8 wherein the settings include an engine mix setting specifying an air-to-fuel ratio.

15. A computer program product comprising:
   a computer readable storage medium; and
   program instructions residing in said storage medium for developing a racing strategy for vehicle settings by receiving a plurality of racing scenarios from a racing data repository wherein each racing scenario includes racing conditions, racing vehicle settings, and racing results, analyzing the racing scenarios to associate specific racing vehicle settings with certain racing conditions and optimal racing results, and creating a pattern template for one or more racing goals based on the specific racing vehicle settings and certain racing conditions.

16. The computer program product of claim 15 wherein the racing goals are selected from the group consisting of faster lap time, better acceleration, less vehicle wear, better fuel economy, more stability, and improved cornering.

17. The computer program product of claim 15 wherein the racing conditions at least includes squad information, equipment information, and environmental information.

18. The computer program product of claim 15 wherein the pattern template includes a set of filters.

19. The computer program product of claim 15 wherein the pattern template includes a set of suggestions of the racing vehicle settings.

20. The computer program product of claim 15 wherein the pattern template includes at least one factor having multiple candidate settings.

* * * * *